United States Patent [19]

Kaplan

[11] 3,791,838

[45] Feb. 12, 1974

[54] VULCANIZATION ACCELERATOR FOR NATURAL AND SYNTHETIC RUBBER

[75] Inventor: Earl Kaplan, Metuchen, N.J.

[73] Assignee: American Cyanamid Company, Stamford, Conn.

[22] Filed: Oct. 13, 1972

[21] Appl. No.: 297,552

Related U.S. Application Data

[63] Continuation-in-part of Ser. No. 119,858, March 1, 1971, which is a continuation of Ser. No. 762,126, Sept. 24, 1968, abandoned.

[52] U.S. Cl............... 106/205, 106/208, 106/209, 106/210, 106/213, 106/214, 260/785
[51] Int. Cl............................................ C08b 25/02
[58] Field of Search... 106/209, 213, 214, 208, 205, 106/210; 260/785

[56] References Cited
UNITED STATES PATENTS

| | | | |
|---|---|---|---|
| 2,798,106 | 7/1957 | Hill et al. | 260/785 |
| 3,130,063 | 4/1964 | Millman et al. | 106/209 |
| 3,480,084 | 11/1969 | Eilers | 106/209 |
| 3,525,697 | 8/1970 | Rogers | 260/785 |

FOREIGN PATENTS OR APPLICATIONS

| | | | |
|---|---|---|---|
| 1,049,206 | 11/1966 | Great Britain | 260/785 |

Primary Examiner—Lorenzo B. Hayes
Attorney, Agent, or Firm—John M. Miele

[57] ABSTRACT

A fast wetting, rubber vulcanization accelerator composition is provided which comprises a major amount of the zinc salt of 2-mercaptobenzothiazole and minor but effective amounts of: (a) a salt of a dialkyl ($C_5$–$C_{20}$) ester of sulfosuccinic acid, and (b) guar gum or starch. Dispersions of the composition in water are stable, fluid and substantially non-thixotropic such that they are storable and can be easily pumped and blended with a rubber latex.

12 Claims, No Drawings

VULCANIZATION ACCELERATOR FOR NATURAL AND SYNTHETIC RUBBER

CROSS REFERENCE TO RELATED APPLICATIONS

This application is a continuation-in-part of U.S. Pat. application Ser. No. 119,858, filed March 1, 1971, which in turn is a continuation of U.S. Pat. application Ser. No. 762,126 filed Sept. 24, 1968, now abandoned.

Generally stated, the subject matter of the present invention relates to rubber vulcanization accelerator compositions in which the accelerator is the zinc salt of 2-mercaptobenzothiazole, and to a process for preparing these compositions.

BACKGROUND OF THE INVENTION

The zinc salt of 2-mercaptobenzothiazole (hereinafter "ZMBT") is a commercial accelerator for the vulcanization of natural and synthetic rubbers. The zinc salt is normally provided in the form of a fine powder which must then be blended with the uncured rubber prior to vulcanization. When the uncured rubber is a dry particulate product, blending presents no problem. However, when the uncured rubber is in the form of an aqueous dispersion, otherwise referred to as a rubber latex, it is difficult to disperse the ZMBT due to the extremely hydrophobic character of ZMBT. As herein employed, the term rubber latex shall be defined to mean an aqueous suspension of an uncured or unvulcanized, synthetic or natural rubber polymer.

Several methods have been disclosed in the art for dispersing ZMBT in a rubber latex. U. S. Pat. No. 2,798,106, Hill et al., described the preparation of a ZMBT paste by mixing mercaptobenzothiazole and zinc oxide while controlling the water content and masticating the resulting slurry until conversion to zinc mercaptobenzothiazole is complete and the particle size is small enough to permit dispersion into a rubber latex. The patent also suggests addition of a dispersing agent such as dioctyl sulfosuccinate and stabilizing agents (anti-settling) such as clays, polyvinyl alcohol, and the like. Although the pastes resulting from the combination of ZMBT, the dispersing agent and the stabilizing agent are fast-wetting and stable, their fluidity tends to be deficient in that the dispersions are thick, non-pourable and non-pumpable. Fluidity, of course, is important in large scale industrial rubber vulcanization operations where the rubber vulcanization accelerator composition generally must be pumped or poured into the rubber latex. While dilution of the dispersion temporarily may improve the fluidity, the dispersion thereby becomes unstable as evidenced by settling out of the ZMBT on standing.

Certain other additives have also been suggested to improve the wettability of ZMBT. Thus, British Pat. No. 1,049,206 suggests the addition to pre-formed ZMBT of one of several types of known wetting agents, including sodium lauryl sulfate and sodium dodecyl benzene sulfonate. The use of stabilizing (thickening) agents, including those of U. S. Pat. No. 2,798,106, is also suggested. Such accelerator compositions likewise suffer from a lack of fluidity and, in addition, are not fast-wetting.

It will therefore be appreciated that the prior art does not completely satisfy the full requirements for a rubber latex vulcanization accelerator composition to be employed in large scale industrial operations. In summary, these requirements are:

I. the ZMBT must be rendered fast-wetting such that when added to water it will readily disperse in 1 minute or less, preferably in less than 30 seconds;

II. The ZMBT composition remains stable in water, i.e., does not settle out on standing for prolonged periods; and III. The ZMBT composition remains sufficiently fluid in water such that it can be prepared, stored and pumped to the rubber latex as required.

To these requirements may be added a fourth requirement; namely, it should be substantially non-thixotropic in water. It will be evident that a ZMBT composition having the first three properties may nevertheless be ruled out in some operations should the composition tend to be unduly thixotropic.

Accordingly, it is a primary object of the invention to provide a rubber vulcanization accelerator composition containing a major amount of the zinc salt of 2-mercaptobenzothiazole as the primary accelerator, which composition is fast-wetting and forms stable and fluid water dispersions which are also substantially non-thixotropic.

An additional object of the invention is to provide a process for preparing a readily dispersible zinc mercaptobenzothiazole composition.

Additional objects and advantages will be set forth in part in the description which follows and in part will be obvious from the description and may be learned by the practice of the invention. The objects and advantages being realized and attained by the means of the processes and improvements particularly pointed out in the appended claims.

THE INVENTION

To achieve the foregoing objects and in accordance with its purpose as embodied and broadly described, the present invention provides a composition which comprises a major amount of the zinc salt of 2-mercaptobenzothiazole (ZMBT) and minor but effective amounts of: (a) a salt of a dialkyl ($C_5$–$C_{20}$) ester of sulfosuccinic acid and (b) guar gum or starch.

This invention also provides a process for preparing a readily dispersible zinc mercaptobenzothiazole composition which comprises intimately admixing the zinc mercaptobenzothiazole with minor but effective amounts of: (a) a salt of a dialkyl ($C_5$–$C_{20}$) ester of sulfosuccinic acid and (b) guar gum or starch.

The invention consists of the novel methods, processes, steps and improvements herein shown and described.

It is to be understood that both the foregoing general description and the following detailed description are exemplary and explanatory and are not restrictive of the invention.

Component (a) comprises the well known class of surfactants otherwise described as the alkyl diester salts of sulfosuccinic acid or the dialkyl sulfosuccinate salts wherein each alkyl (ester) group contains 5 through 20 carbon atoms in straight or branched chain arrangement, including ester groups of mixed carbon content and spatial configuration. The preferred alkyl groups contain 5 through 13 carbon atoms. Representative and preferred salts include the following commercially available products: sodium diamyl sulfosuccinate, sodium dihexyl sulfosuccinate, sodium dioctyl sulfosuccinate and sodium bis(tridecyl) sulfosuccinate. The alkali metal salts are preferred, especially the sodium salt, but the salt-forming group may also include other common monovalent cations, e.g., the ammonium, substituted ammonium, and quaternary ammonium cations. Among substituted ammonium cations may be mentioned methyl, dimethyl, trimethyl, tetramethyl, ammonium cations and the like. Quaternary ammonium cations include dimethyl piperdinium cation and cations derived from various amines such as ethylamine, diethylamine, triethylamine, mixtures thereof, and the like.

The guar gum or starch includes any of the natural products or their modifications which retain the essential properties of the natural products. Guar gum is normally provided as a free-flowing, whitish powder but other forms are also suitable. Starch from various sources may be employed, for example, grain starch which includes corn and rice, root or tuber starch which includes tapioca, arrowroot and potato, and pith starch which is prepared from the stems of certain palms, such as sago. Dry, granular starch is preferred but other forms are also suitable, such as pastes, gels or sols.

Various procedures may be employed for preparing the ZMBT. In one procedure an aqueous solution of zinc chloride is added to an aqueous solution of the sodium salt of 2-mercaptobenzothiazole. The ZMBT precipitate which forms is then recovered by filtration and is washed. The resulting wet cake is then dried to produce ZMBT as a dry powder. Alternatively, zinc oxide and 2-mercaptobenzothiazole may be ball-milled in the presence of water to form the ZMBT, after which the mixture is dried to a powder.

The composition of the present invention may be prepared by blending ZMBT (as a powder or as a wet cake or paste such as described in U. S. Pat. No. 2,798,106), the sulfosuccinate salt and the guar gum or starch. The order of addition is not important and preferably each ingredient is employed in the dry state. The mixing may be achieved by any suitable means and is continued for a period of time effective to render the mixture homogeneous.

The proportions of ZMBT, sulfosuccinate salt and guar gum or starch are chosen so as to achieve the properties of stability, fluidity, wettability and hydroscopicity described above, when the composition is added to water or a vulcanizable rubber latex. Preferred proportions are about 0.5% through 2.5% of sulfosuccinate salt and from about 0.25% through 2.0% of guar gum or starch, each based on the weight of ZMBT in the composition. The composition may be added directly to the rubber latex but preferably is first dispersed in water.

Other materials may be added to the compositions of the invention provided they do not detract from the essential properties of the composition. For example, other known rubber vulcanization accelerators may be added, such as the well known organic thiurams, including tetramethylthiuram disulfide and the like, anticaking agents, such as calcium and magnesium silicates, and other additives generally employed in vulcanizable rubber latices.

Water dispersions of the accelerator composition may then be stored for extended periods of time without unduly settling out or becoming unduly thixotropic.

The following examples are provided for illustrative purposes and may include particular features of the invention. However, the examples should not be construed as limiting the invention, many variations of which are possible without departing from the spirit or scope thereof.

EXAMPLE I

To a suitable blending device is added dry ground ZMBT, 98.625 parts, guar gum (commercial "JAGUAR J-2S1"), 0.375 part, and sodium dioctyl sulfosuccinate, 1.0 part, each by weight. The composition (sample A) is thoroughly blended and then tested for dispersibility in water by adding an amount of the composition, sufficient to provide 2 parts of ZMBT, to 50 parts of water and then noting the time for complete wetting out of the composition (without stirring) with no surface deposition of powder. The wetting time in accordance with this test is 10 seconds as compared with over 1 hour for the same test conducted with a control sample containing only ZMBT.

Two compositions (samples B and C), identical to the above except for replacement of sodium dioctyl sulfosuccinate with anionic condensed naphthalene sulfonate (commercial "Tamol N") and anionic sodium lignin sulfonate (commerical "Indulin C"), respectively, exhibit wetting times of over 1 hour at which time the test is terminated.

Removal of the guar gum from each composition of this example does not substantially affect the wetting times.

The above compositions are tested for settling tendencies by blending to a smooth slurry a mixture of 50 parts water and sufficient of the compositions to provide 50 parts of ZMBT, allowing the slurries to stand without agitation, and observing the amount and character of sediment after 6 and 24 hours. The following results are observed:

| Sample | SEDIMENT | |
|---|---|---|
| | After 6 hours | After 24 hours |
| Control | considerable, hard packing | same |
| A | very slight, soft packing | same |
| B | very slight, soft packing | same |
| C | very slight, soft packing | same |

EXAMPLE II

To a ball mill is charged the following composition:

| | |
|---|---|
| Zinc oxide | 72.0 parts |
| ZMBT | 18.0 parts |
| Sulfur | 54.0 parts |
| Sodium dioctyl sulfosuccinate | 6.0 parts |
| Guar gum | 0.4 parts |
| Water | 156.0 parts |

This composition is milled for 48 hours to obtain uniform dispersion.

To 1,600 parts of a natural rubber latex of 62.5% solids are added 90 parts of the above dispersion, 100 parts of 10% casein, and 100 parts of a 50% titanium dioxide dispersion. After thorough mixing, the latex formula is poured into a suitable vessel and allowed to dry to remove the water, the partially dried material being turned over occasionally to ensure even drying of both surfaces. The product is then vulcanized according to conventional procedures.

When the ZMBT used in the above formulation is unmodified, prolonged stirring is required to wet out the ZMBT powder prior to ball milling. ZMBT modified according to the process of the present invention, on the other hand, wets out immediately, eliminating the need for prolonged preliminary stirring. Moreover, unmodified ZMBT, because of the difficulties in dispersing it properly, is apt not to be uniformly distributed throughout the dried latex and thus causes problems in curing the vulcanizate which become evident in deficient properties of the cured vulcanizate. The modified ZMBT of the present invention does not present these difficulties.

Additionally, if unmodified ZMBT dispersion is not used immediately after preparation, the ZMBT tends to settle and it must be redispersed by tedious procedures. Dispersions prepared from the modified ZMBT of the present invention, however, may be stored for extended periods, thereby avoiding the need for substantial redispersion.

EXAMPLES III–XIII

The compositions set forth in Table I below are prepared substantially as described in Example I and tested for wettability, stability, fluidity and thixotropy, first, after adding the compositions to water (Result A in Table II below), and secondly, after adding sufficient of each composition to a mixture of 36 parts of water and 2.2 volumes of 22% sodium hydroxide to provide 44 parts of ZMBT in the mixture (Result B in Table II below). This second mixture illustrates the composition of a typical rubber latex, absent the rubber.

It will be seen from the above results that it cannot be predicted which of the known dispersing agents will promote wetting out of ZMBT in 1 minute or less time.

Moreover, even when good wetting was provided, the results show that it cannot be predicted which of the known thickeners when combined with the wetting agents would promote fluidity, stability and non-thixotropy in the ZMBT compositions. Thus, even though sodium lauryl sulfate provided good wetting, the ZMBT compositions either were unstable (Example III) or were unduly thixotropic even when combined with guar gum or starch (Examples IX and X).

EXAMPLE XIV

Following the procedure set forth in U. S. Pat. No. 2,798,106, Hill et al., Example 3, a ball mill was charged with 54 parts zinc oxide, 185 parts mercaptobenzothiazole, 10 parts dioctylsulfosuccinate and 60 parts water. The composition was ball milled for 16 hours, the thick "putty-like" contents discharged, dried at 100° C. and ground into a powder. Analysis showed the presence of 46.2% unreacted mercaptobenzothiazole. The dried powder wet out in water in about 5 seconds.

To 40 parts of the dried solid was added (a) 2 parts carboxymethylcellulose and (b) 2 parts guar gum, respectively. Compositions (a) and (b) were used to prepare typical formulations for rubber latex use, as follows: the composition, 42 grams, was dispersed into 34.4 mol. water. Both compositions wet out readily. To these dispersions was added 2.1 ml. of 22% sodium hydroxide; both dispersions formed thick, non-pourable pastes, unsuitable for latex use.

TABLE 1

ZMBT Compositions, Parts by Weight

| Ex. No. | ZMBT | SLS[1] | Bentonite Clay | Calcium Silicate | SDSS[2] | SDBS[3] | Guar Gum | Potato Starch | SCMC[4] | SINS[5] | SFAS[6] | Corn Starch |
|---|---|---|---|---|---|---|---|---|---|---|---|---|
| 3 | 100 | 1.0 | 2.0 | 3 | | | | | | | | |
| 4 | 100 | | | | 1.0 | | 0.375 | | | | | |
| 5 | 100 | | | | | 1.0 | 0.375 | | | | | |
| 6 | 100 | | | | 1.0 | | | 2.0 | | | | |
| 7 | 100 | | | 2.0 | | | | | 1.0 | 0.5 | | |
| 8 | 100 | | 2.0 | 2.0 | | | | | | | 1.0 | |
| 9 | 100 | 1.0 | | | | | 0.375 | | | | | |
| 10 | 100 | 1.0 | | | | | | 2.0 | | | | |
| 11 | 100 | | 2.0 | 2.0 | 1.0 | | | | | | | |
| 12 | 100 | | | 2.0 | 1.0 | | 0.375 | | | | | |
| 13 | 100 | | | | 1.0 | | | | | | | 2.0 |

[1] Sodium lauryl sulfate
[2] Sodium dioctyl sulfosuccinate
[3] Sodium dodecylbenzene sulfonate
[4] Sodium carboxymethyl cellulose
[5] Sodium isopropylnaphthalene sulfonate
[6] Sulfated fatty acid salt

TABLE 2

| Example No. | Result A | Result B |
|---|---|---|
| 3 | Wetted out in about 1 minute | Very thick and non-pourable after standing a short while |
| 4 | Wetted out in about 10 seconds | Stable, completely fluid and pourable after standing over 24 hours |
| 5 | No wetting out even after 5 minutes stirring | |
| 6 | Completely wetted out in less than 1 minute | Stable, fluid dispersion |
| 7 | No wetting out after 12 minutes | |
| 8 | No wetting out after stirring for more than 2 minutes | |
| 9 | Wetted out after 2 minutes | Non-settling but thixotropic |
| 10 | Wetted out after 2 minutes | Non-settling but thixotropic |
| 11 | Wetted out in 18 seconds | Non-settling but thixotropic |
| 12 | Wetted out in 20 seconds | Non-settling but thixotropic |
| 13 | Wetted out in 26 seconds | Very slight settling; slightly thixotropic but acceptably pourable |

It is readily apparent that the ZMBT compositions prepared according to the Hill et al patent are unsuitable for the preparation of dispersions for use in rubber latex whether they contain carboxymethylcellulose or guar gum, since they form thick, non-pourable dispersions when added to an aqueous alkaline medium.

EXAMPLE XV

Following the procedure set forth in British Pat. No. 1,049,206, Jones et al., Example 2, compositions were prepared as shown below:

|  | Parts by weight | |
|---|---|---|
|  | A | B |
| Zinc 2-mercaptobenzothiazole | 100 | 100 |
| Sodium salt of sulfated butyl oleate | 1 | 1 |
| Sodium secondary octyl sulfate | 1 | 1 |
| Calcium silicate | 2 | 2 |
| Bentonite Clay | 2 | — |
| Guar gum | — | 2 |

Both compositions A and B wet out readily in water. To two 4 ounce bottles containing 36 ml. of water was added 44 grams of A and B, respectively, using mechanical agitation where necessary to obtain a dispersion. To each of the bottles was then added 2.2 ml. of 20% sodium hydroxide. The dispersion containing A remained pourable but settled out to the extent of about 20% after standing for one day. The dispersion containing B was a thick, non-pourable "putty-like" paste.

These results clearly show that the compositions disclosed in the Jones et al., patent form unstable dispersions in an aqueous alkaline medium and are thus not satisfactory for use in rubber latex. Furthermore, when guar gum is substituted for the bentonite, a composition results which is a thick, non-pourable paste in an aqueous alkaline medium and is therefore unsuitable for rubber latex use.

EXAMPLE XVI

Following the procedure set forth in U. S. Pat. No. 3,525,697, Rogers, compositions were prepared as shown below:

|  | Parts by weight | |
|---|---|---|
|  | A | B |
| Zinc 2-mercaptobenzothiazole | 100 | 100 |
| Calcium silicate | 2 | 2 |
| Sodium salt of a secondary alkyl sulfate | 1 | 1 |
| Diethanolamine salt of sulfated monobutyl oleate | 2 | 2 |
| Bentonite | 2 | — |
| Guar gum | — | 2 |

Both compositions A and B wet out readily in water. To two 4 ounce bottles containing 36 ml. of water was added 44 grams of A and B, respectively, using mechanical agitation where necessary to obtain a dispersion. To each of the bottles was then added 2.2 ml. of 22% sodium hydroxide. The dispersion containing A remained pourable but settled out to the extent of about 10% after standing 1 day. The dispersion containing B produced a uniform gummy, rubbery mass, completely non-stirrable and non-pourable. The entire mass could be pierced by a glass rod and remained in one glob which did not readily fall from the tip of the glass rod.

These results also demonstrate that the compositions disclosed in the Rogers patent form unstable dispersions in an aqueous alkaline medium and are thus not satisfactory for use in rubber latex. Furthermore, when guar gum is substituted for the bentonite, a composition results which is a thick, non-pourable mass and is wholly unsuitable for use in a rubber latex.

I claim:

1. A vulcanization accelerator composition which comprises the zinc salt of 2-mercaptobenzothiazole as the accelerator, and (a) a salt of a dialkyl ester, of 5 to 20 carbon atom, of sulfosuccinic acid and (b) guar gum or starch, the components (a) and (b) being present in amounts sufficient to render the composition fast-wetting, stable, fluid and substantially non-thixotropic when added to an aqueous medium.

2. The composition according to claim 1 wherein the amount of (a) is from about 0.5% through 2.5% and the amount of (b) is from about 0.25% through 2.0%, each based on the weight of said zinc salt of 2-mercaptobenzothiazole.

3. The composition according to claim 1 wherein (a) is the sodium salt of dioctylsulfosuccinic acid.

4. The composition according to claim 1 wherein (a) is sodium diamyl sulfosuccinate.

5. The composition according to claim 1 wherein (b) is guar gum.

6. The composition according to claim 1 wherein (b) is potato starch.

7. The composition according to claim 1 wherein (a) is the sodium salt of dioctylsulfosuccinic acid and (b) is potato starch.

8. The composition according to claim 1 wherein (a) is the sodium salt of dioctylsulfosuccinic acid and (b) is guar gum.

9. A process for preparing a readily dispersible vulcanization accelerator composition of a zinc salt of 2-mercaptobenzothiazole which comprises intimately admixing with such salt (a) a salt of a dialkyl ester, of 5 to 20 carbon atom, of sulfosuccinic acid and (b) guar gum or starch, the components (a) and (b) being present in amounts sufficient to render the composition fast-wetting, stable, fluid and substantially non-thixotropic when added to an aqueous medium.

10. The process according to claim 9 wherein the amount of (a) is from about 0.5% through 2.5% and the amount of (b) is from about 0.25% through 2.0%, each based on the weight of said zinc salt of 2-mercaptobenzothiazole.

11. The process according to claim 9 wherein (a) is the sodium salt of dioctylsulfosuccinic acid and (b) is potato starch.

12. The process according to claim 9 wherein (a) is the sodium salt of dioctylsulfosuccinic acid and (b) is guar gum.

* * * * *